(12) United States Patent
Shekar et al.

(10) Patent No.: US 8,190,583 B1
(45) Date of Patent: May 29, 2012

(54) CHARGEBACK IN A DATA STORAGE SYSTEM USING DATA SETS

(75) Inventors: Raja Shekar, Bangalore (IN); Brian M. Hackworth, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 561 days.

(21) Appl. No.: 12/018,772

(22) Filed: Jan. 23, 2008

(51) Int. Cl.
*G06F 17/30* (2006.01)

(52) U.S. Cl. ........................................ 707/688; 707/694

(58) Field of Classification Search ........................ None
See application file for complete search history.

(56) References Cited

U.S. PATENT DOCUMENTS

| | | | |
|---|---|---|---|
| 2002/0049608 A1* | 4/2002 | Hartsell et al. | 705/1 |
| 2002/0175938 A1* | 11/2002 | Hackworth | 345/751 |
| 2005/0033757 A1* | 2/2005 | Greenblatt et al. | 707/100 |

* cited by examiner

*Primary Examiner* — Syed H Hasan
(74) *Attorney, Agent, or Firm* — Perkins Coie LLP

(57) ABSTRACT

A method and an apparatus to provide chargeback data for data sets are presented. In one embodiment, the method includes allowing an administrator of a data storage system to define a data set having a plurality of storage objects and to associate the data set with a data management policy and an owner. The method includes generating a report allocating usage for billing (for example) for an owner of a data set by tracking the storage elements used to implement the defined data set according to the data management policy. The method may further include using a storage manager to manage and track the data set as a single unit according to the data management policy.

14 Claims, 14 Drawing Sheets

Options

Chargeback

| | | |
|---|---|---|
| Chargeback Increment | Daily ▼ | 610 |
| Currency Format | $ #,###.## | 620 |
| Annual Charge Rate (per GB) | 75 | 630 |
| Day of the Month for Billing | 1 | 640 |

Resource Labels - Annual Charge Rate (per GB)

| | | |
|---|---|---|
| Tier-1 | 100 | 650 |
| Tier-2 | 60 | 660 |
| Tier-3 | 40 | 670 |

Back | Update

| 700 | Data Set Chargeback by Usage, This Month | | | | | | | 19 Oct 21:10 |
|---|---|---|---|---|---|---|---|---|

Group Status | Member Details
Summary  File SRM  Streaming  Events

Global                                                              Report [Data Set Chargeback by Usage, This Month ▼]

| Data Set ▲ | Period Begin | Period End | Days in Cycle | Average Usage | Annual Rate (per GB) | Monthly Rate (per GB) | Charge |
|---|---|---|---|---|---|---|---|
| exchange-corporate-ds | 01 Oct | 31 Oct | 31 | 22.2 GB | $60.00 | $5.10 | $113.08 |
| oracle-customer-service-ds | 01 Oct | 31 Oct | 31 | 23.5 GB | $60.00 | $5.10 | $119.87 |
| oracle-inventory-ds | 01 Oct | 31 Oct | 31 | 26.4 GB | $60.00 | $5.10 | $134.77 |
| oracle-support-ds | 01 Oct | 31 Oct | 31 | 31.1 GB | $60.00 | $5.10 | $158.70 |
| sap-manufacturing-ds | 01 Oct | 31 Oct | 31 | 83.7 GB | $60.00 | $5.10 | $426.53 |
| sap-payroll-ds | 01 Oct | 31 Oct | 31 | 2.97 GB | $60.00 | $5.10 | $15.16 |
| Totals | 01 Oct | 31 Oct | 31 | 190 GB | | | $968.10 |

FIG. 7

CHARGEBACK IN A DATA STORAGE SYSTEM USING DATA SETS

TECHNICAL FIELD

The present invention relates to networked data storage systems, and more particularly, to managing data storage using data sets.

BACKGROUND

A networked data storage system can be used for a variety of purposes, such as providing multiple users access to shared data, or facilitating backups or data mirroring. A networked data storage system may include a number of storage servers. A storage server provides services related to the accessing and organizing data on mass storage devices, such as disks. Some storage servers are commonly referred to as filers or file servers, as these storage servers provide clients with file-level access to data. Some storage servers provide clients with sub-file level access to data (e.g., block-level access). Other storage servers provide clients with both file-level access and sub-file level access; an example of such a storage server is any of the Filer products made by Network Appliance, Inc. in Sunnyvale, Calif. A storage server may be implemented with a special-purpose computer or a general-purpose computer programmed in a particular way. Depending on the application, various networked storage systems may include different numbers of storage servers.

Logical units of storage may be created and manipulated on storage servers, such as files, directories volumes, qtrees (which is a subset of a volume, optionally associated with a space usage quota), logical unit numbers (LUNs), etc. Such logical units are referred to as storage objects in this document. Creating a single storage object is typically fast and easy, but managing a storage object over time is more difficult. A storage administrator has to make numerous decisions, such as how to monitor the available space for the storage object, how to schedule data backups, how to configure backups, whether the data should be mirrored, where data should be mirrored, etc. Answers to the above questions may be summarized in a data management policy. When the data management policy is determined, the administrator works to ensure that the policy is correctly implemented on all relevant storage objects, that the required space is available, that the data protection operations succeed, and the like. If the administrator decides to change the policy (for example, extending the amount of time that backups should be retained), the administrator normally must find all of the affected storage objects and then manually re-configure all of the relevant settings.

As the number of storage objects grows in the system, the administrator's job becomes more difficult and complex. It becomes increasingly likely that the administrator may not readily determine what policy was supposed to apply to a given storage object, or why a given volume is mirrored. In addition, the administrator normally has to perform many tedious manual tasks for each storage object, which can be error prone and unreliable. A large data center may have hundreds to over a thousand storage servers. Each storage server may manage hundreds of storage objects (e.g., volumes and thousands of qtrees). This leads to a total of tens to hundreds of thousands of storage objects to manage with a similar number of backup and mirror relationships. The number of objects typically grows faster than information technology headcounts, so each administrator manages more and more objects over time. Eventually, the sheer number of objects makes it increasingly less economical, if not impossible, for an administrator to reliably implement data management policies and to accurately provide records for billing (e.g., chargeback) purposes. To accurately provide records for charge back purposes, the storage provider currently needs to identify all the volumes that store data for an application, add them to a resource group using the storage manager, and then generate workgroup level chargeback reports. Maintaining correct membership for workgroups adds considerable overhead in a rapidly evolving data center.

Chargeback is a process of billing users of storage solutions for (ideally) the actual costs of providing the services to the users. Tracking actual costs of IT equipment is difficult, especially when the equipment is shared by different workgroups within a company that the IT administrator serves. Often the cost is merely "expensed" as a general overhead cost because of the difficulties in aggregating the actual costs incurred by each workgroup. Accurately aggregating the costs by workgroup can be difficult because of the ever-changing configuration of storage solutions that are implemented using high or low performance equipment that has varying ages (and may or may not be fully amortized) and because of differing administration policies. Intelligent guesses are often used to assign the varying costs, but the guesses suffer from being subjective, and are subject to being challenged by supervisors and managers seeking to protect their budgets. Thus, a storage administrator needs help tracking what storage objects exist in a storage system, how the storage objects relate to users, and which chargeback policies should be applied to the storage objects.

SUMMARY

The present disclosure includes a method and an apparatus to bill users of storage solutions using data sets. A data set is a collection of related storage elements used for a specific purpose. A storage element is a basic unit for data storage, such as a volume. A data set can be formed, for example, by logically associating all volumes that store data for a particular database instance. Treating related storage elements as a data set simplifies management tasks because each task can be performed on a data set basis instead of repeatedly performing them for each storage element. Tracking of behavior of a data set over time greatly simplifies the overhead associated with billing for the use of each storage element.

In one embodiment, the method includes allowing an administrator of a data storage system to define a data set having a plurality of storage elements and to associate a data set with a data management policy and an owner. The method includes generating a chargeback report for an owner of a data set by tracking storage elements used to implement the defined data set according to the data management policy. The method may further include using a storage manager to manage and track the data set as a single unit according to the data management policy. Thus, a chargeback report can be easily generated by tracking a data set so that storage provider can bill customers for storage elements used to implement a storage solution for a data set.

Other features of the present disclosure will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which:

FIG. 6 illustrates a GUI for accepting input from a user for providing billing; and FIG. 7 illustrates a billing report that lists billing information by data set usage.

DETAILED DESCRIPTION

Figure 1:
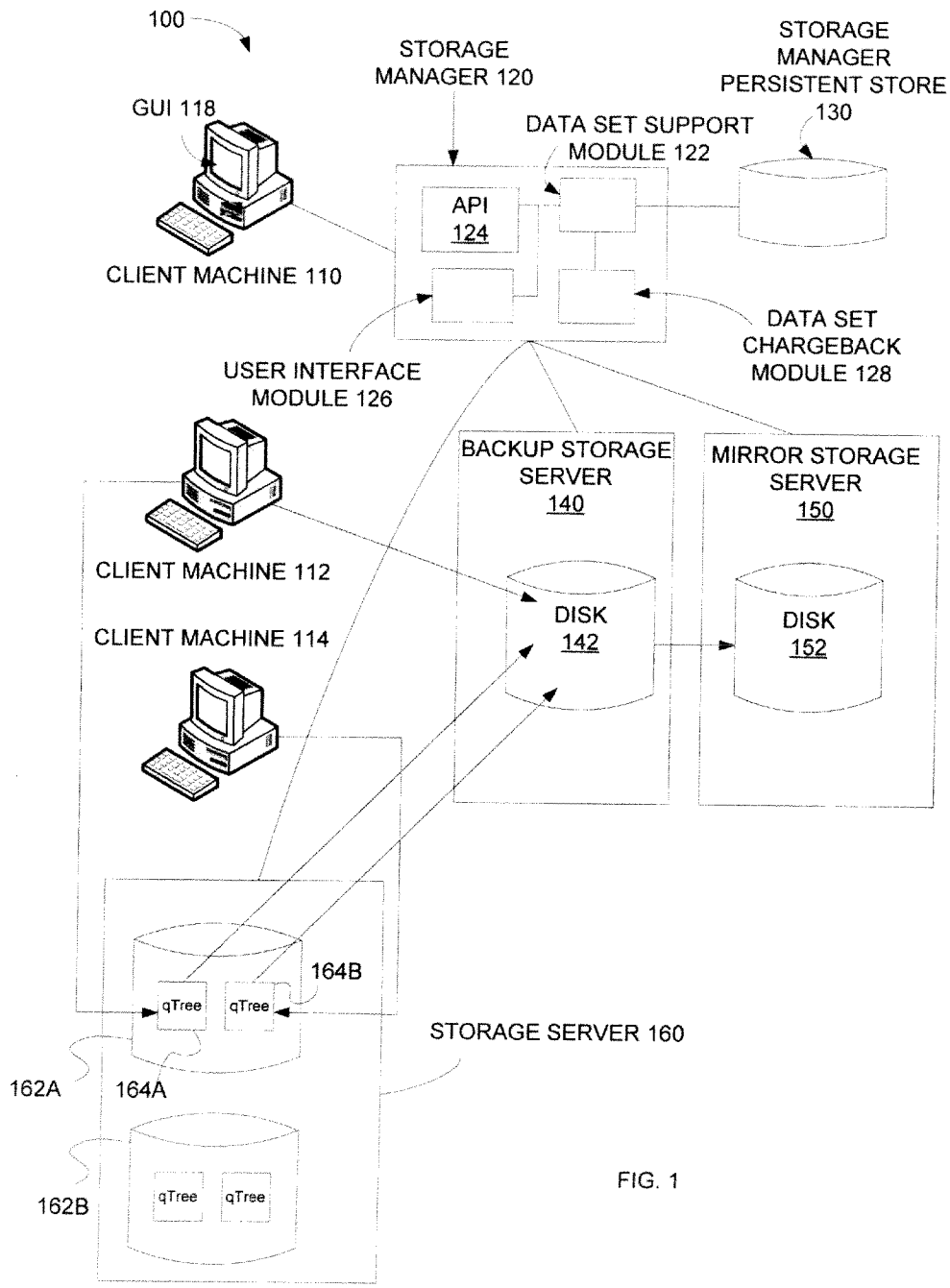
FIG. 1 illustrates an embodiment of a networked storage system.

A method and an apparatus to provide chargeback using data sets in a data storage system are described. In the following description, numerous specific details are set forth. However, it is understood that embodiments of the invention may be practiced without these specific details. In other instances, well-known components, structures, and techniques have not been shown in detail in order not to obscure the understanding of this description.

In one embodiment, the method includes allowing an administrator of a network data storage system to define a data set having a set of storage objects associated with a data management policy. Each storage object may include logical representations of a collection of data and replicas of the collection of data. The collection of data is normally stored in one or more storage containers. A storage container can be a device used for long-term storage of memory, such as a disk, RAID group, plex, aggregate (of plexes), volumes, qtrees, LUNs (logical unit number), and the like. The storage containers are managed by one or more storage servers in the data storage system and are independent of the logical representation.

The method further includes generating a chargeback report for an owner of a data set by tracking the storage elements used to implement the defined data set according to the data management policy. A single unit in the context of the following discussion is a set (such as a data set, or a subset of the data set) having one or more elements, which may be manipulated by the administrator as a whole without referring to each individual elements of the set. Thus, a data set is treated as a single unit such that the storage manager (as discussed with reference to FIG. 2 below) applies the data management policy to all storage elements in the data set.

Providing chargeback reports for owners of data sets is non-trivial because the storage elements used to implement the data management policies (and the storage element status, such as percentage of memory used) is often changing. For example, as data storage is "used up," new storage space needs to be made available. Manually tracking these changes to collect chargeback information is difficult because the administrator needs to track the use of storage elements over time. Chargeback is made easier by assigning "owners" (such as a workgroup) to data sets. As the data set policies are automatically implemented, the costs for storage for a data set owner can be logged (or contemporaneously calculated) by associating the storage use (or change in use) with the data set owner. Logging the changes (or contemporaneously calculating costs) allows chargeback to be accomplished without undue human intervention and forensic analysis. Using data sets and data management policies can vastly reduce the workload and overhead of determining and providing chargeback information for data stored for different workgroups in different amounts over varying periods of time. The data sets, storage objects, and data management policy are further discussed below.

System Overview

FIG. 1 shows a networked data storage system 100 according to some embodiments of the present invention. The system 100 includes client machines 110, 112, and 114, a storage manager 120, a storage manager persistent store 130, a storage server 160, a backup storage server 140, and a mirror storage server 150. The above components can be coupled to each other through one or more of various types of networks, such as local area network (LAN), wide area network (WAN), etc. Moreover, the networked connection may be wireline, wireless, or a combination of both. As such, the above components may or may not be located at different geographical locations.

In one embodiment, data is stored and transferred in units of files in the data storage system 100. Therefore, the system 100 may be a file-based networked storage system. In such an embodiment, the system 100 can be a network-attached storage (NAS) system that provides clients with access to data at the file level. A NAS system uses file access protocols to retrieve data, such as, for example, Network File System (NFS), or Common Internet File System (CIFS). The files are logically arranged into directories. A volume of storage devices may be mapped to one or more directories. Alternatively, the system 100 may include or be part of a storage area network (SAN), to provide clients with access to data at the block level of storage servers. A block is the basic unit used to store data in the SAN.

Note that any or all of the components of system 100 and associated hardware may be used in various embodiments of the present invention. However, it can be appreciated that other configurations of the networked data storage system 100 may include more or fewer devices than those discussed above.

In one embodiment, the client machine 110 is used by a storage administrator, and thus, may be referred to as an administrative client. In contrast, the other client machines 112 and 114 are used by users of the network data storage system 100 to access data, and thus, may be referred to as storage clients. Of course, a storage client an administrative client may not be mutually exclusive, that is, both the administrator and users may use the same client machine in some embodiments. The client machines 110, 112, and 114 may be implemented on personal computers (PCs), laptop computers, special purpose computing devices, etc. The client machines 110, 112, and 114 often belong to users that work for different organizations and/or workgroups.

Figure 2:
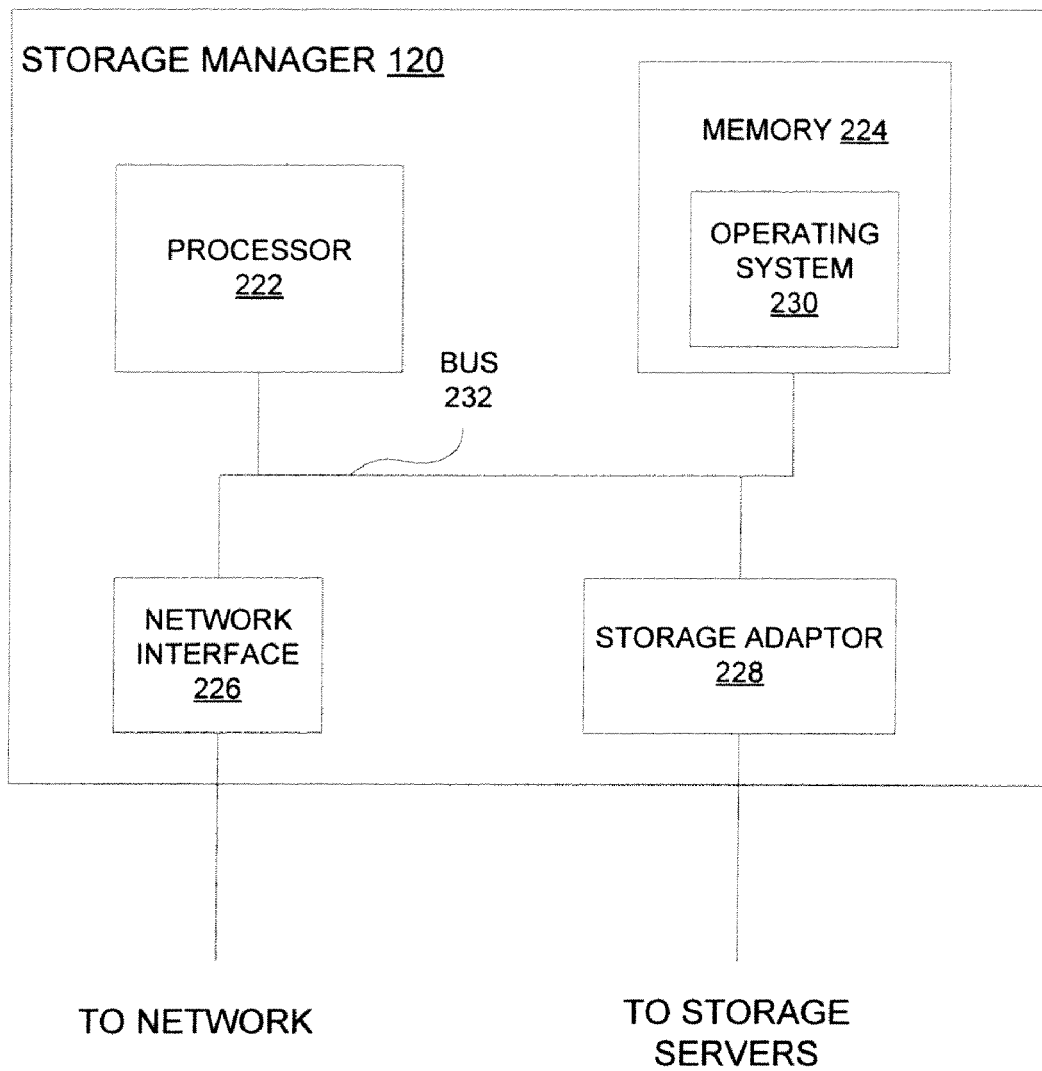
FIG. 2 illustrates an embodiment of a storage manager.

Referring back to FIG. 1, the client machine 110 is coupled to the storage manager 120, which is further coupled to the storage manager persistent store 130. The storage manager 120 is an application that is used by an administrator to implement and manage data storage solutions (such as where a workgroup's data should be stored and how it should be backed-up.). The storage manager 120 may be implemented on one or more servers, personal computers (PCs), special-purpose computing machines, etc. Details of one embodiment of a machine usable to implement the storage manager 120 are shown in FIG. 2. The storage manager 120 may include an application programming interface (API) 124 to interface with the client machine 110. Further, the storage manager 120 may include a data set support module 122 to manage data sets and implement related policies. The storage manager may also include a data set chargeback module 128 to, for example, individually bill different workgoups of users for their data storage by using data set information to accumulate chargeback data. The storage manager 120 may further include a user interface module 126 to create a user interface (e.g., graphical user interface (GUI), command line interface (CLI), etc.) and to provide the user interface to the client machine 110 via the API 124. In some embodiments, the API 124 may be implemented on a separate server coupled between the storage manager 120 and the client machine 110. The client machine 110 includes a display (e.g., a monitor) to present the user interface (e.g., the GUI 118) to an administrator of the data storage system 100. Using the GUI 118, the administrator may input information of data sets and data management policies to the storage manager 120. In some embodiments, the GUI 118 is presented via a network access application, such as an internet browser, to the administrator. Some exemplary embodiments of screen displays of the GUI 118 are illustrated in FIGS. 3A-3D.

Based on the administrator inputs, the data set support module 122 creates, removes, and or updates data sets, where each data set is associated with a data management policy. Objects representing the data sets and the data management policy are stored in the storage manager persistent store 130. The storage manager persistent store 130 may be implemented using a storage device that stores data persistently, such as a disk, a read-only memory (ROM), etc. Using the data sets and the data management policies, the storage manager 120 manages data in the data storage system 100. More details of the data sets, data management policies, and data management using data sets are discussed below.

In addition to the client machine 110 and the storage manager persistent store 130, the storage manager 120 is further coupled to the storage server 160, the backup storage server 140, and the mirror storage server 150. It should be apparent that the storage servers 140, 150, and 160 are shown in FIG. 1 as examples for illustrative purpose only. Other embodiments of the data storage system may include more or fewer storage servers, each storage server managing a set of physical storage devices, such as magnetic disks, optical disks, tape drives, etc. in different configurations.

Referring back to FIG. 1, the storage server 160 manages two disks 162A and 162B. The disks 162A and 162B may hold various storage containers, either in whole or in part. A storage container is a unit for storing data, such as a file, a directory, a qtree, a volume, a LUN, etc. For instance, the disk 162A holds two qtrees 164A and 164B. As another example, a disk may hold part of a volume, where the volume spans multiple disks.

The client machines 112 and 114 may access the disks managed by the storage server 160. For example, the client machine 112 stores data in the qtree 164A, while the client machine 114 stores data in the qtree 164B. To protect the data in the qtrees 164A and 164B, the storage server 160 may send the data in the qtrees 164A and 164B to the backup storage server 140, which creates a backup copy of the data in the qtrees 164A and 164B in the disk 142. In addition, the backup storage server 140 may further mirror the disk 142 onto the disk 152 managed by the mirror storage server 150. In some embodiments, the client machine 112 may store data in an internal disk (not shown) and have the internal disk backed up in the disk 142 managed by the backup storage server 140. Note that the above are merely one example of data protection policy topologies. It should be appreciated that many different data protection policy topologies may be implemented in the system 100.

As the numbers of storage servers and disks grow in the networked data storage system 100, the workload as well as the complexity of data management increases. Thus, it becomes more difficult for the administrator to manually manage (including billing and forecasting usage by different workgroups) data in the system 100. In order to improve efficiency and to reduce the risk of making errors, the storage manager 120 automatically uses data sets to manage data and provide chargeback information in the networked data storage system 100 according to data management policies from the administrator. Details of data sets and the use of data sets are discussed below.

Data Sets and Storage Objects

To efficiently manage data, the data set support module 122 in the storage manager 120 uses data sets to manage data in some embodiments. In one embodiment, a data set includes references to a set of storage objects associated with a data management policy. The data management policy is applied as a single unit to the data set, directing how the administrator wishes the data in the storage elements of the data set to be managed. For example, a storage object may be defined to be a home directory of an employee in a company division (or workgroup), which is a member of a data set of the home directories of all employees in the company division. The storage object includes at least one storage element of the data set. Before going further into the details of the data set and the data management policy, details of a storage object are described below.

A storage object may include a logical representation of a collection of data in one or more storage containers and replicas of the collection of data (e.g., red copy of the data and/or a backed up copy of the data). Referring back to the above example, a logical representation of the storage object of the employee's home directory may be the employee's identification (ID), such as "jsmith." The collection of data may be created by users or the administrator of the data storage system 100. In some embodiments, the data of a storage object is stored in a storage container or a set of storage containers (e.g., the disk 162) managed by one or more storage servers (such as the storage server 160) in the data storage system 100. For example, the content of the employee's home directory in the above example may be stored in the qtree 164A in the disk 162A.

Some examples of storage objects include qtrees, volumes, directories, etc. These examples may also be referred to as elementary storage objects because they are logical representations of data in basic units of storage in the networked data storage system 100. Further, a storage object may be a reference to a collection of elementary storage objects, such as a reference to all volumes managed by a storage server.

Note that the physical implementation of the storage containers is independent of the logical representation of the data. Thus, the data is not managed by where the data is stored or how the data is accessed. Rather, the data is managed by the logical representation, which may be associated with the content of the data. For instance, the data may be a word processing document, ("employee_review.doc") stored in the disk 162A. In the current example, the logical representation may be the name of the document (e.g., "employee_review.doc"). The storage manager 120 may manage the document by the name of the document (i.e., "employee_review.doc"), rather than by the storage container (e.g., the disk 162A in the current example) or the set of storage containers in which the document is stored. The physical implementation of the disk 162A is independent of the name of the document (e.g., "employee_review.doc") stored in the disk 162A. As such, the storage object, as well as the data set having the storage object, are not bound to any actual physical location or storage container and may move to another location or another storage container over time. For example, the storage containers associated with a data set may become obsolete in performance over time, and the storage manager 120 may therefore move the data to a set of new storage containers, with or without alerting the administrator. Any movement of data sets may be substantially transparent from the administrator's perspective in order to provide a separation of the logical representation from the physical location. Thus, the storage manager 120 may re-balance resources (e.g., the disks 162A, 162B, 142, and 152) in the data storage system 100 over time. In other words, the data set provides the virtualization of the physical storage containers used to hold the data.

In some embodiments, a data set includes user created data as well as meta data. Meta data generally is information about the user created data. Examples of meta data include exported names, language settings, storage server association, LUN mappings, replication configuration, quotas, policies, consistency groups, etc. Meta data may be used to move or restore the corresponding data set. A complete data set backup (i.e. both user data and meta data) is thus useful in handling disaster recovery scenarios. If the storage server (e.g., a filer) which hosts the primary storage set associated with the data set is destroyed, the data set may be reconstructed on another storage server using another storage set that is a replica of the primary storage set to provide client data access without manual configuration by the administrator.

Furthermore, a data set may have two types of membership of the storage objects which it contains, namely static and dynamic membership. Static members are low level storage objects (volumes, directories, LUNs) which could be managed by themselves. In other words, the elementary storage objects mentioned above are static members. Dynamic members are references to storage objects which may contain other storage objects. For example, an administrator could add a user's home directory to a data set as a static member. Alternatively, the administrator could realize that a given storage server is only used to hold home directories and add the storage server itself to a data set as a dynamic member. Adding the storage server itself to the data set allows the cost of the storage server to be allocated to the owner of the data set automatically.

Beyond membership, a data set accumulates the status of its members according to some embodiments of the invention. There may be multiple status parameters an administrator may wish to track. Some exemplary status parameters include a data availability status, a data protection status, and a data protection policy conformance. The data availability status indicates whether all components of the data set are available for use. The data protection status indicates that all the data set members are being protected by a data protection policy. The data protection policy conformance status indicates that the data protection mechanisms (e.g., snapshots, backups, and mirrors) have been configured in accordance with the data protection policy. The data protection policy is typically associated with an organizational group (such as a division or project team of a corporation) so that the data protection can be specified and applied in accordance with the workgroup's needs. The storage manager 120 may roll up (e.g., accumulate) the corresponding statuses of members of the data set to derive or to generate chargeback data for the data set. The storage manager 120 automatically discovers the storage servers and the storage objects already created on them. The administrator can add the discovered storage objects to data sets. The storage manager also allows creation of new storage objects and adding them to data sets.

Operations on Data Sets

In some embodiments, the storage manager 120 may perform various operations on a data set. Some examples of operations include chargeback of services provided for the data set, changing or modifying an associated data management policy of a data set, provisioning (configuring for use) storage objects to be added to a data set, listing members in a data set, adding members to a data set, deleting or removing storage objects from a data set, migrating a data set to a different set of storage containers, generating performance views specific to a data set, generating storage usage reports of a data set, setting quota on a data set or individual members within a data set. The above list is not an exhaustive list of all of the possible operations.

Chargeback for organizational workgroups receiving storage solutions can be performed by using the association of defined data sets to various workgroups. Because organizational structures are set-oriented, set principles can be used to apply set operations (such as sets, subsets, joinder, exclusion, supersets and the like) to members of workgroups. Thus chargeback can be apportioned using set operations. Chargeback functionality is described further below.

Data Management Policy

As mentioned above, the storage objects in the data set are associated with a data management policy and organizational workgroups. In general, a data management policy is associated with an organizational workgroup (having granularities of individual users and/or tasks). The policies (such as the data management and/or provisioning policies), storage objects, other associated objects, or combinations thereof can be used to track services provided by the system to various workgroups. The services can be tracked, for example, by logging the time period during which a service was rendered, or contemporaneously calculating an accumulated cost (e.g., a cost-to-date).

A data management policy for a data set for a workgroup typically includes a description of the desired behavior of the associated data set. For instance, a data management policy may describe how the storage should be used and configured. One exemplary data management policy is a data protection policy, which describes how storage objects in a data set should be protected. Attributes associated with a data management policy can be abstracted at the highest level possible, which allows implementations of the data set to change over time without adversely impacting the administrator. In other words, implementation details are hidden from the administrator about the physical implementation of the storage containers in which the data is stored. Thus, automatically aggregating chargeback data for data sets as implemented using various policies normally shields the administrator from having to deal with a virtually unlimited pool of various underlying implementations that "belong" to different organizations.

Chargeback data can be a list of changes to the storage solution that is implemented for the benefit of the owner (such as an organization). The changes (and initial implementation) can be caused by changing the data set, changing the management policy, as well as implementing the management policy. The changes can be listed by, for example, recording which storage objects are associated with the data set (such as on a daily basis). The changes can also be listed by recording the changes to a known configuration, and the time (and/or time interval) the change occurred. The changes can also specify the attributes of the storage objects (such as high or low performance) used so that costs can be allocated to the owner using more equitable bases. As described below and with further reference to FIGS. 5A-5E, costs of storage objects can be allocated using resource pools and resource labels for the storage objects. The labels can be user-defined, which allows reports to be generated to track costs in accordance with the desires of a user. A generated report can be used to allocate within a company or even to external customer that use data sets as storage solutions.

Once the administrator has added the desired members to the data set, the storage manager 120 can automatically start applying the data management policy associated with the data set to all members in the data set. For example, the storage manager 120 can configure storage objects in the data set, schedule backup of the storage objects in the data set, etc., according to the data management policy. A log of events, storage used, the level of tiered service used, peak time usage rates, and the like can be made by associating a data set owner with each of the actions taken by the storage manager. If the administrator attempts to apply a different data management policy to a subset of storage object(s) in the data set (where the data management policy is different than the currently applied, either directly, or indirectly, as in under the principles of inheritance), then the storage manager 120 can generate an error message to alert the administrator, who tray respond by reassigning the subset of storage object(s) to another data set or by creating a new data set for the subset of storage object(s).

Without data set chargeback as disclosed herein, the task of accurately billing users for actual services rendered is made increasingly more difficult because the actual implementations of the policy are removed from the administrator's top-level view. Examples of attributes include costing rates for storage on a storage object (e.g., dollars per gigabyte per day), bandwidth performance of the storage object (e.g., a scaling factor in accordance with the bandwidth capability of the server), availability of the storage object (e.g., is the storage object reserved), reliability of the storage object (e.g., a higher scaling factor can be given for a storage object having a higher mean time between failures), type of data protection, capacity related actions, security settings, capabilities, peak-usage times, and the like. The storage manager uses data sets to provide chargeback reports that enable both the storage provider to quickly bill based on storage used by various applications and the storage user to identify how various applications are utilizing space and the cost of operating those applications. Storage providers also ensure that data set membership is up-to-date based on other requirements like data protection. Chargeback using data sets removes the overhead of creating resource groups and maintaining the membership just for the purpose of generating chargeback reports. As discussed above, chargeback reports can be generated in a number of ways. The chargeback reports can be generated based upon the amount of storage allocated and/or actually used. Options for billing can be assessed at a global level or on a resource group level. At a global level the options can include options such as annual charge rate, chargeback increment (such as lowest size of memory considered for billing), day of the month to bill, and the like. At the resource group level, options can include, for example, individual cost rates.

In some embodiments, the storage containers in the system 100 (which may be collectively referred to as a resource pool) are labeled with user-defined strings, such as "tier-1," "tier-2," and "tier-3." Such labels may be specified as part of a provisioning policy to limit physical storage resources to a selected data set. When provisioning storage, policies may specify labels for the storage containers to be used for the resulting data set. For example, customers desiring a high level of service (and who are willing to pay more for it) can be assigned, for example, "tier-1" service by having top-tier storage containers assigned to them by specifying "tier-1" service in the policy used to manage the customer's data set. The storage manager will allow the administrator to specify the cost rate (e.g., "dollar per gigabyte per day") for different labels that the administrator defines. The cost rates are used in the subsequent calculations for billing customers.

Providing the chargeback data for billing customers for such provisioned hardware having different levels of service (such as capacity, bandwidth consumed at peak usage times, backup frequency, mirror depth, reliability levels) is difficult because of the need to associate the costs of a wide variety of services with specific actions and specific customers. The chargeback data for billing can be accumulated according to actual implementation of the storage solution automatically provided for a data set (without the data administrator having to determine the actual implementation). For example, chargeback data is desired so that the owner of a data set having a management policy, which states that the owner is to be charged for all storage related to the data set, can be billed. As described above, the data set is managed by a policy that states how the data is to be stored as well as when it is to be billed. As the policy is implemented, various storage containers are used and freed in accordance with various tiers of service. Attributes of each storage container relevant to billing (i.e., chargeback) are logged, as well as the time the change is implemented. At a billing time (which can be specified arbitrarily by the administrator) or at a time indicated by the data management policy, the log can be used to compute costs by using attributes such as costing rates, bandwidth performance, and the like. (As mentioned above, a running cost total can be maintained by computing costs contemporaneously with the changes.) Because the data sets are assigned by "owner," the costs for implementing the data set can be apportioned by the owner of the dataset.

Note that the computed billing data associated with a data set automatically follows changes to data management policies by the administrator. For example, as the data in tier-1 storage ages, the relevance or importance of the data may diminish, and thus, the data may be migrated to tier-2 storage from the tier-1 storage.

In some embodiments, the administrator may determine which data sets are candidates for migration and associate such data sets with a policy created for data in tier-2 storage. Because chargeback can consider the various tiers of storage, the amounts calculated for chargeback amounts can reflect the various tiers used when the data is migrated. For example, an administrator can change the level of service from "tier-1" to "tier-2" by changing the management policy. The data in the data set is migrated from tier-1 storage to (typically cheaper) tier-2 storage. The time and the specific change in service (as well as optionally the amount of data transferred) for the data set is logged. The storage containers are assigned to data set in accordance with their tiers (and have different billing levels) as specified in their attributes. The billing data (chargeback data) is automatically calculated using the logged data for a given time period.

Chargeback Using Data Sets

Chargeback using data sets and data management policies as described herein can vastly reduce the workload of storage administrators. There are at least two ways in which using data sets as described herein help reduce manual administrative work and ensure a more equitable cost sharing.

First, chargeback using data sets can reduce work by reducing the number of objects a storage administrator has to evaluate. While a data center may have hundreds of thousands of directories, these may be "owned" (e.g., assigned to a workgroup that is a customer of the IT department) by a much smaller number of workgoups, and have even fewer associated chargeback policies. For example, every user in a large enterprise may have a home directory, but these all need to be billed in the same way. Thus, these home directories can be collected into a single data set associated with a data management policy for a workgroup. (The single data set is thus automatically associated with a workgroup). This means that no matter how large the enterprise grows, there is no additional day-to-day management burden for the administrator as new users are assigned to the workgroup. When a new home directory is created, it is added, manually or automatically, to a data set containing other home directories, chargeback for the workgroup (which can be based on the number of users in a workgroup) is automatically accumulated using the data set information.

The second way a data set reduces work is by automating implementation of and changes to chargeback policies. For example, suppose a data administrator decided that user home directories should be backed up, but the secondary storage holding the backups did not need further protection. Further, suppose the administrator subsequently decided this was not adequate and that home directory backups should be mirrored to off-site storage. In a conventional environment, this would be a huge task, including, for example, tracking down all the secondary volumes which have ever held home directory backups, provisioning appropriate mirrored storage, configuring all the mirror processes, and monitoring that the mirror operations have been succeeding, etc. Using a data set associated with a data management policy, the administrator only has to modify the data management policy to add a mirroring stage. Because the backup/mirroring policy is implemented automatically, the activity is logged so that the cost can be automatically allocated to the owner of the data set. The storage manager 120 may then perform the tedious task of finding all the volumes which now require mirrors, provision the mirrored storage, and establish the relationships, etc. The storage manager 120 may record (and accumulate charges) for the changes as changes occur to the storage object or policies, or can do so on a periodic basis using a log of the events.

Storage Manager

One embodiment of the storage manager 120 may be implemented on a server as illustrated in FIG. 2. Referring to FIG. 2, the storage manager 120 includes a processor 222, a memory 224, a network interface 226, and a storage adaptor 228, which are coupled to each other via a bus system 232. The bus system 232 may include one or more busses and/or interconnects. The storage manager 120 communicates with a network (e.g., the Internet) via the network interface 226, which can be an Ethernet adaptor, fiber channel adaptor, etc. The network interface 226 may be coupled to a public network, a private network, or a combination of both in order to communicate with a client machine (such as the client machine 110) usable by an administrator of the data storage system.

In one embodiment, the processor 222 reads instructions from the memory 224 and executes the instructions. The memory 224 may include any of various types of memory devices, such as, for example, random access memory (RAM), read-only memory (ROM), flash memory, one or more mass storage devices (e.g., disks), etc. The memory 224 stores instructions of an operating system 230. The processor 222 may retrieve the instructions from the memory 224 to run the operating system 230. The storage manager 120 interfaces with the storage servers (e.g., the storage servers 110 and 112) via the storage adaptor 228, which can be a small computer system face (SCSI) adaptor, fiber channel adaptor, etc.

User Interface

Figure 3A:
FIGS. 3A-3C illustrate an embodiment of a series of GUI screens to create a new data set.
Figure 3B:
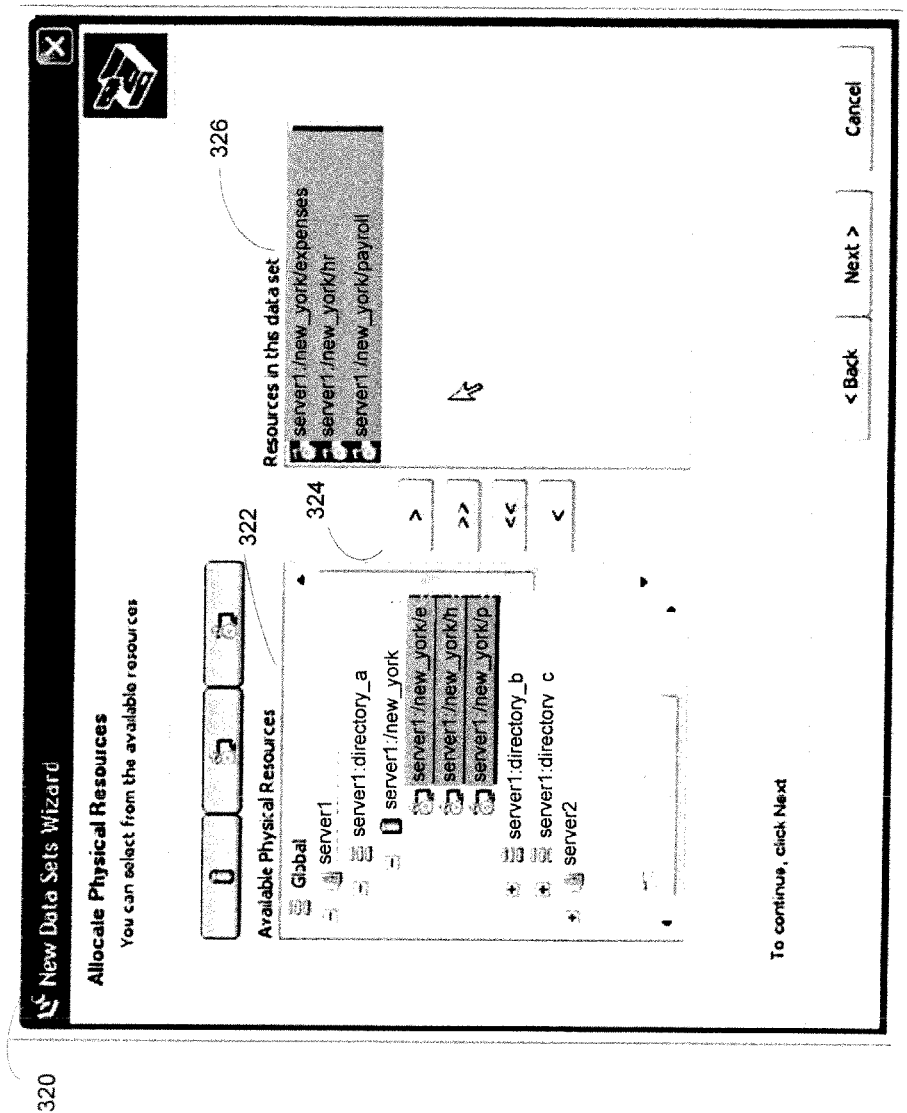
Figure 3C:
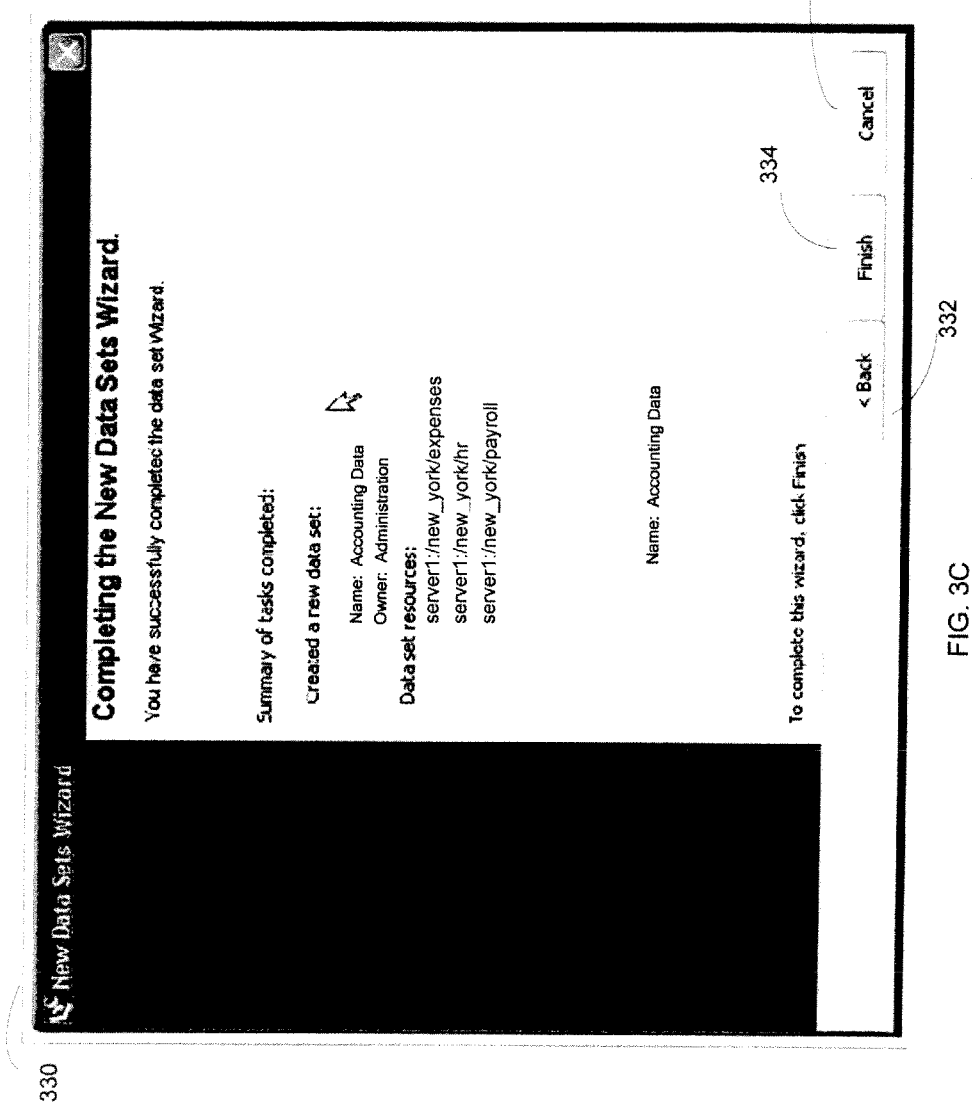

FIGS. 3A-3C illustrate one embodiment of a series of displays of GUI, generated by the storage manager, to enable an administrator to create a new data set. Referring to FIG. 3A, a GUI 310 for creating new data sets is shown. The GUI 310 may be displayed via a window created by the client machine 110 in FIG. 1. The GUI 310 includes a field 312 for entry of a name of the data set and a field 314 for entry of the description of the data set. In the current example, an administrator has input "Accounting Data" as the name of a new data set. In some embodiments, the GUI 310 includes additional fields for entry of other attributes or information of the new data set, such as owner, contact, time zone. The GUI 310 also includes a field 316 for entry of the name of a workgroup that that "owns" (for example, for billing purposes) the data set. Thus, implementation of the data set and policies applied to the data set can be associated with the owner of the data set by consulting the contents of the field.

FIG. 3B illustrates one embodiment of a display of a GUI used in creating the new data set. The GUI 320 includes a list 322 of available physical resources (e.g., available directories) to be added into the new data set. The administrator may select from the list 322 of physical resources by clicking onto the particular resource. The GUI 320 further includes a set of user interface controls 324 to allow the administrator to add the selected physical resources to the new data set. The GUI 320 includes a field 326 to display the selected physical resources in the data set.

The displayed selected physical resources are associated with the owner of the data set so that chargeback can be accomplished. The time of the modification and the actions can be logged and associated with the data set. The log can be used to automatically produce a chargeback report that can, for example, accurately bill for the use of the resources for the times in which the resources were actually allocated.

FIG. 3C illustrates one embodiment of a display of a GUI used in creating the new data set. The GUI 330 shows a summary of the new data set created using the GUI 310 and 320 in FIGS. 3A and 3B, including the name of the organization to be used for chargeback purposes, which is "Administration" in this example. The administrator may verify the newly created data set using the GUI 330 and if desired, may return to the GUI 310 and/or 320, to make changes using the user interface control 332. The administrator may confirm the creation of the new data set by actuating the user interface control 334. Finally, the administrator may cancel the creation of the new data set by actuating the user interface control 336.

Figure 3D:
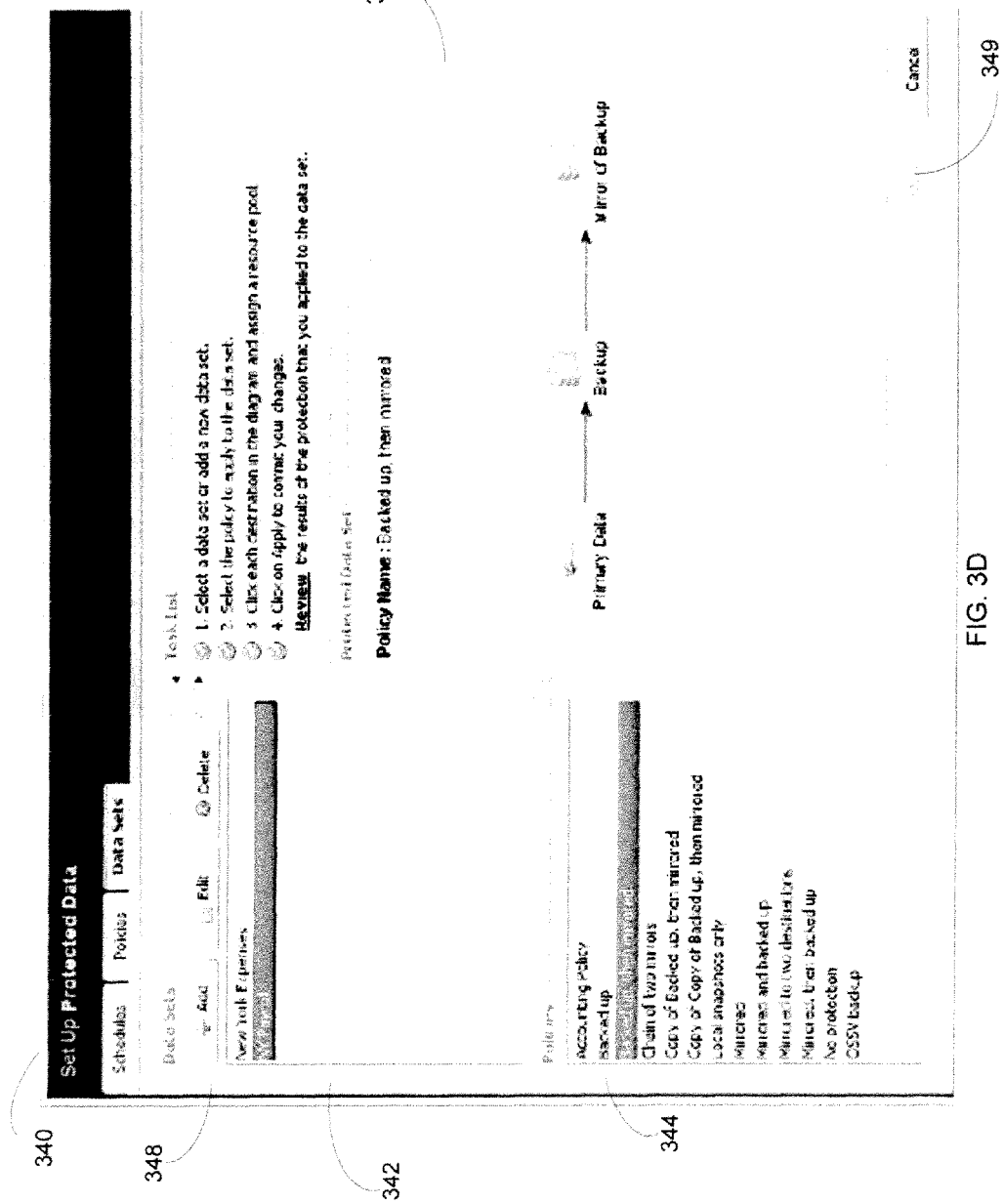
FIG. 3D illustrates an embodiment of a GUI screen for applying a data management policy to a data set.

FIG. 3D illustrates one embodiment of a display of a GUI for applying a data management policy to a data set. The GUI 340 includes a field 342 displaying data sets created, a field 344 displaying data management policies, a field 346 to display details of a data management policy selected. An administrator may click on a data set in the field 342 to select the data set. For instance, the data set "NY Payroll" is selected in the example shown in FIG. 3D. The GUI 340 further includes user interface controls 348 to allow the administrator to add, edit, or delete a data set. The administrator may select one of the data management policies in the field 344 to apply to the selected data set by first clicking on the desired data management policy and the desired data set to select them, and then actuating the "Apply" button 349 to apply the selected policy to the selected data set. In the current example, the administrator has selected the policy of "Backed up, then mirrored" in the field 344, and details of this policy is displayed in the field 346 in graphics, text, or a combination of both. As discussed above, the physical allocation of resources is determined at least in part by the implementation of the policy.

Process to Manage Data

Figure 4:
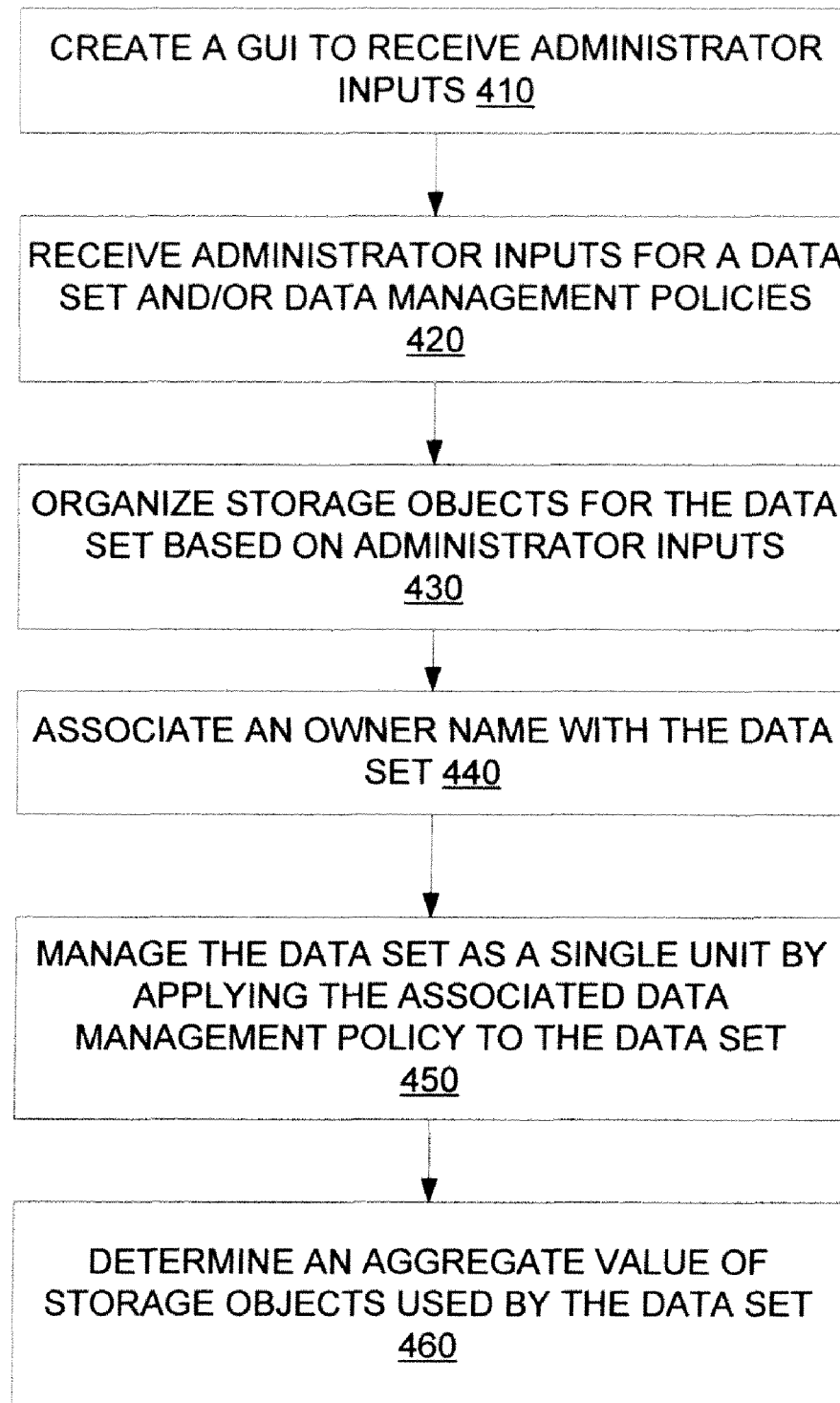
FIG. 4 illustrates a flow diagram of an embodiment of a process to provide chargeback for storage objects using data sets.

FIG. 4 illustrates a flow diagram of one embodiment of a process to provide chargeback in a data storage system using data sets. The process is performed by processing logic that is typically hosted by the storage manager that comprises hardware (e.g., circuitry, dedicated logic, etc.), software (such as is run on a general-purpose computer system or a dedicated machine, such as the storage manager 120 in FIG. 1), or a combination of both.

Referring to FIG. 4, processing logic creates a GUI to receive inputs from an administrator of the data storage system (processing block 410). Processing logic then receives administrator inputs on data sets and/or data management policies (processing block 420). For example, the administrator may provide information via the GUI to define data sets (e.g., names and description of the data set, storage objects to be included in the data set, etc.) and to define data management policies (e.g., a data protection policy). The processing logic organizes storage objects specified by the administrator into data sets based on administrator inputs (processing block 430).

Processing logic may associate an owner name with the data set, for example, by using a GUI as described above (processing logic 440). Then processing logic manages each data set as a single unit by applying a corresponding data management policy to the data set (processing block 450). For example, processing logic may apply the data manage policy by configuring the storage objects, scheduling backups of the storage objects, etc., according to the data management policy.

Further, processing logic may determine a cumulative value of storage objects used by each data set (processing block 460). The cumulative value can be a running total of charges accrued within a billing period. For example, the period of time a storage container is used (within a billing window) can be multiplied by the billing rate of the storage container to produce an accumulated cost for the storage container used by the owner of the data set. The accumulated cost of each storage container can be summed to produce the accumulated value of storage objects. Changes to the storage objects can be logged to accumulate the usage of the storage objects by the data set in response to a change in the data management policy. (Accumulating the usage can be the total of the lengths of time that each storage container is associated with a data set during a billing window.)

The logged changes can be used to determine a type of change and a time that is associated with the change because the log typically specifies each change to the storage containers used to implement policies for a data set and when the changes occurred. The usage of the storage objects for chargeback by the data set can also be accumulated by comparing the logged times with a predetermined list of peak usage rates and then multiplying (and accumulating) the usage by the rates that apply at the time the usage occurred. The usage of the data sets for chargeback can be provided in reports of usage of storage hardware used by multiple owners of data sets, and reported on a per-owner basis, for example.

Figure 5A:
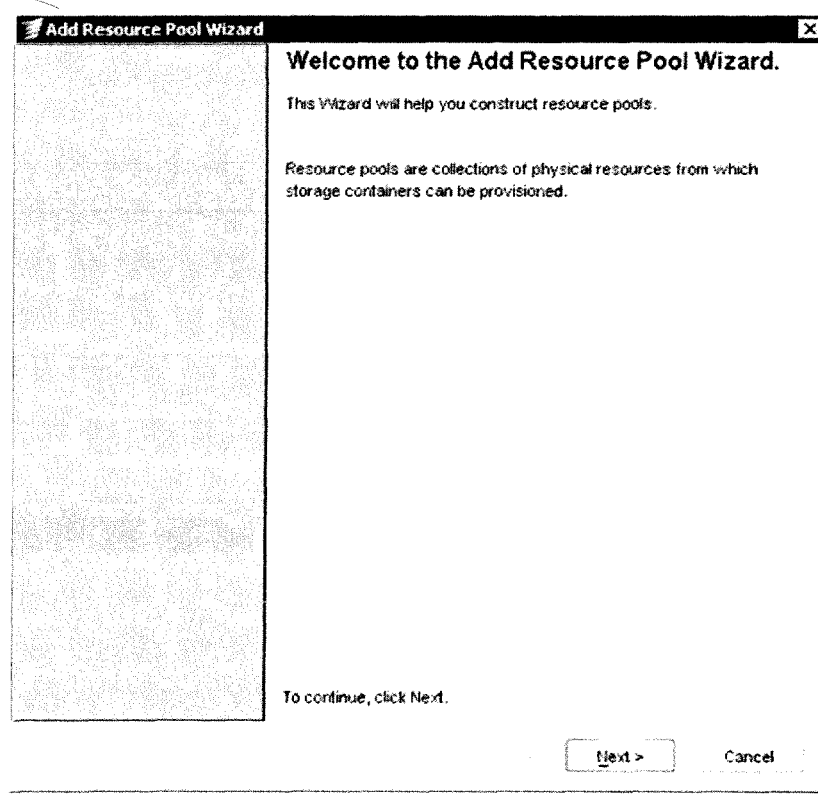
FIGS. 5A-5E illustrate an embodiment of a series of GUI screens to create a resource pool having chargeback capabilities.
Figure 5B:
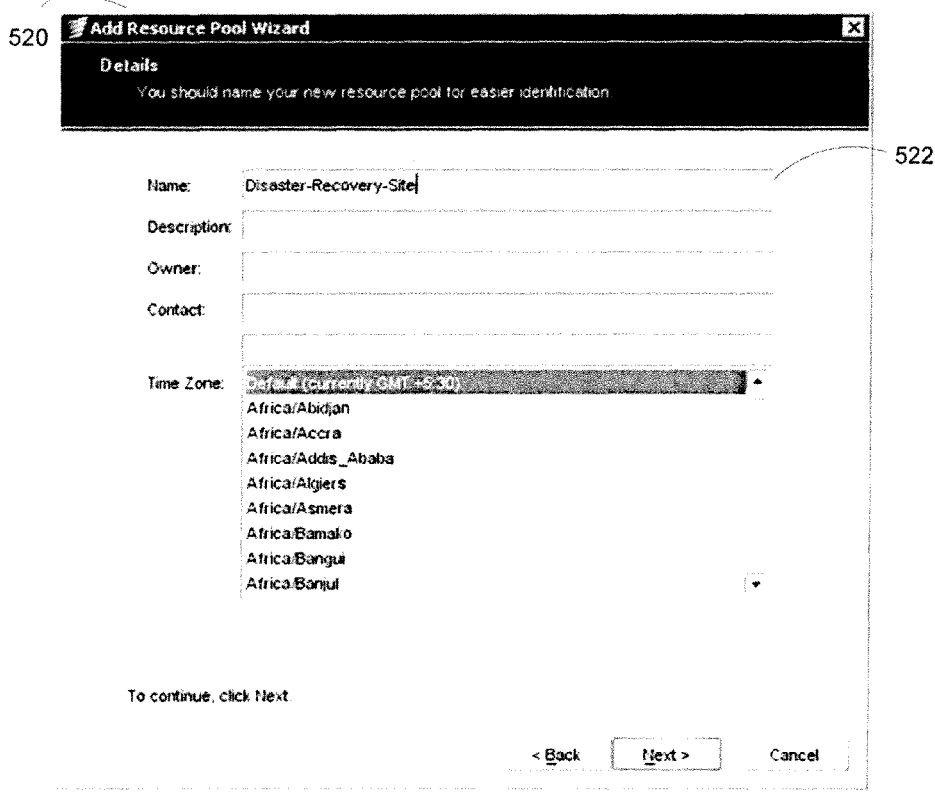
Figure 5C:
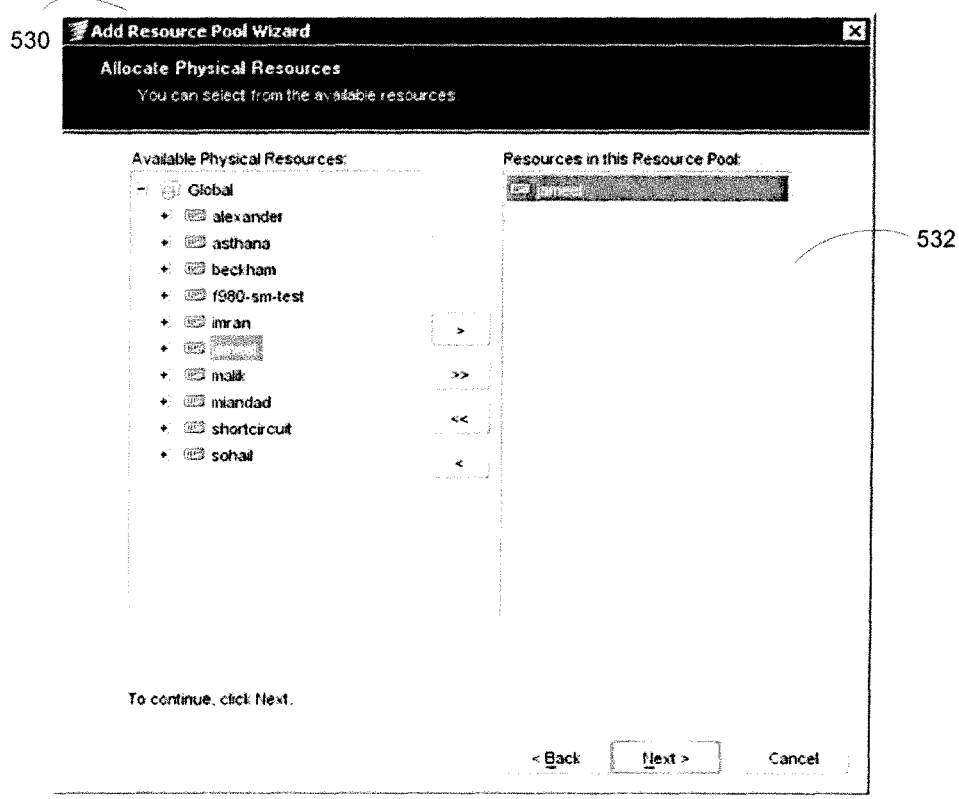
Figure 5D:
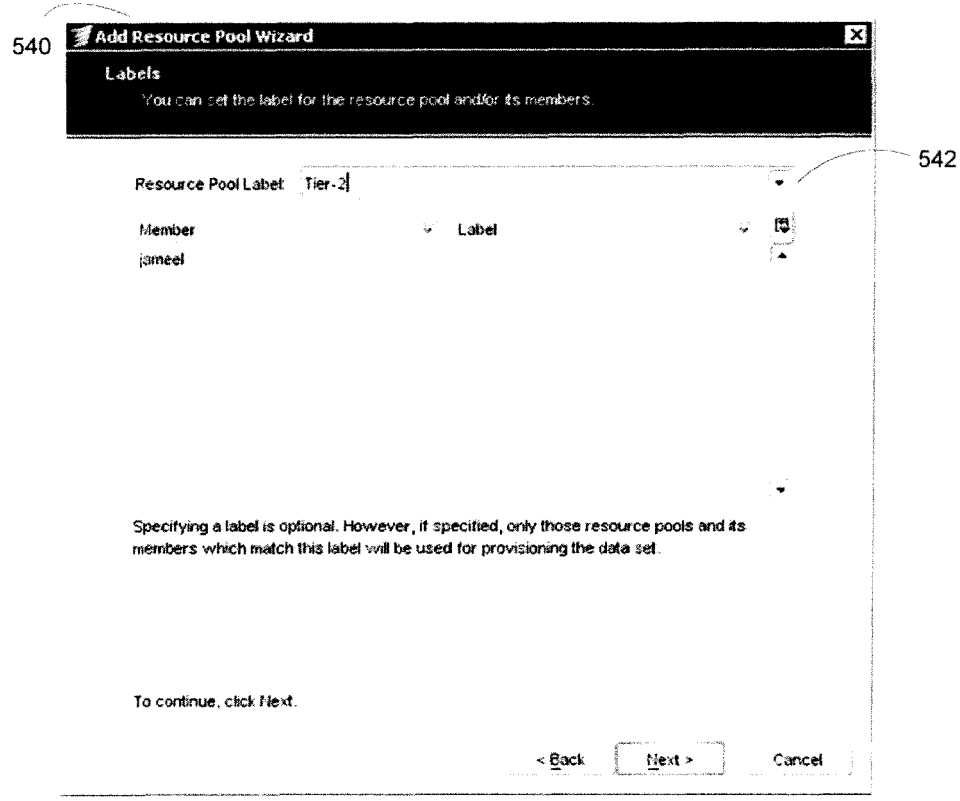
Figure 5E:
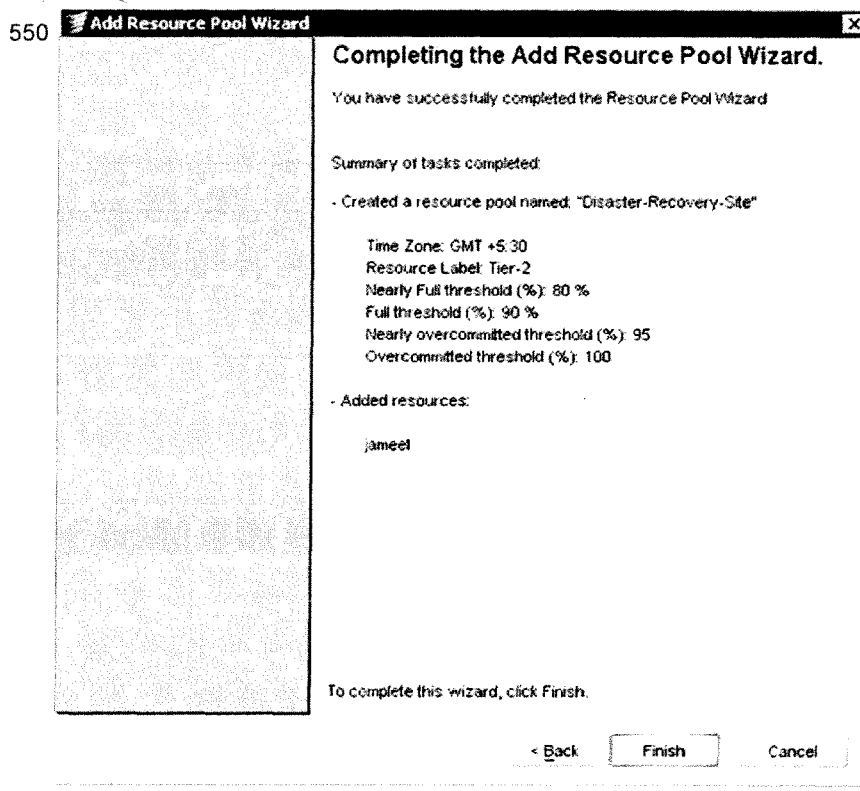

FIGS. 5A-5E illustrate an embodiment of a series of GUI screens to create a resource pool having chargeback capabilities. FIG. 5A illustrates a welcome screen 510 for an add resource pool wizard. FIG. 5B illustrates a GUI 520 for providing information for identifying the new resource pool. Field 522 shows the new resource pool is named "Disaster-Recovery-Site." FIG. 5C illustrates a GUI 530 for allocating physical resources for populating a resource pool. Pane 532 indicates that resource "jameel" has been selected. FIG. 5D illustrates a GUI 540 for specifying labels for a resource pool and/or its members. Labels can be either specified for the entire resource pool or for each storage server/storage object that is added to the resource pool. If labels are specified at multiple levels, the label specified at the storage object normally takes precedence over the label at storage server level, which in turn takes precedence over the resource pool level label. Field 542 indicates that a resource pool label "Tier-2" has been specified. In the example, only those resource pools and members that match the label will be used for provisioning the data set. FIG. 5E illustrates a GUI 550 for listing a summary of the tasks completed by the add resource pool wizard.

FIG. 6 illustrates a GUI for accepting input from a user for providing billing. GUI 600 provides a field 610 for selecting a billing increment (e.g., daily, monthly, and the like). Field 620 provides a format in which to display currency for billing. Field 630 allows a user to specify a charging rate (such as dollars per gigabyte). The charging rate can be combined with the billing rate to calculate how much is owed. Field 640 can be used to specify a day of the billing cycle for billing. Fields 650, 660, and 670 can be used to specify billing rates for various "tiers" of service.

FIG. 7 illustrates a billing report that lists billing information by data set usage. Report 700 lists each data set, average usage by the data set, a charging rate, and a calculated charge for each data set. The report 700 also lists a total charge and average usage for all data sets listed in the report.

Some portions of the preceding detailed description are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and other data similarly represented as physical quantities within the computer system memories or registers or other such information storage, transmission or display devices.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a machine-accessible medium, also referred to as a computer-readable medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. An apparatus comprising:
   a user interface module to allow an administrator of a data storage system to define a data set having storage objects and to associate the data set with an owner and a data management policy, wherein each storage object includes a logical representation of data stored in storage containers that are managed by storage severs in the data storage system, wherein a physical implementation of the storage containers is independent of the logical representation of the storage containers, wherein the data set is a singular logical storage unit representation of the plurality of storage objects, the data set enabling storage and management of data across the plurality of storage objects via a singular entity, and wherein the data set includes associated meta data for mapping the data set to each of the plurality of storage objects, wherein the data set is instantiated as a unique logical entity in the data storage system with independently attached metadata and includes references to the plurality of storage objects represented by the data set; and
   a data set manager to manage the data set as a single unit and to identify storage consumed by each data set in accordance with implementation of the data management policy and the associated owner of the data set, wherein an action corresponding to the data management policy is directly applied to the data set existing as a unique logical entity in the data storage system, wherein the storage objects have differing tiers of charging rates, and wherein the usage of the storage objects by the data set is accumulated in accordance with a tier associated with each storage object that is used by the data set, and wherein the usage of the storage objects by the data set is accumulated by comparing logged times associated with the usage with a predetermined list of peak usage rates.

2. The apparatus of claim 1, wherein the data set manager produces a billing report for the associated owner of the data set.

3. The apparatus of claim 1, further comprising:
   a persistent store coupled to the storage manager to log usage of storage containers by a data set over time.

4. The apparatus of claim 1, wherein the user interface includes a graphical user interface (GUI) to display data management policies, data sets, owners of data sets, and user interface controls to allow the administrator to apply one of a list of predetermined data management policies to a selected data set.

5. The apparatus of claim 4, wherein the GUI further includes:
   a display of the accumulated usage of each of the data sets based on the usage of storage containers by each data set over time.

6. The apparatus of claim 5, wherein the accumulated usage is multiplied by a cost rate to generate an amount owed for a billing report.

7. A computer-implemented method comprising:
   defining a data set including a plurality of storage objects;
   managing the data set as a single unit according to a data management policy, wherein an action corresponding to the data management policy is directly applied to the data set existing as a unique logical entity in the data storage system, wherein the data set is a singular logical storage unit representation of the plurality of storage objects, the data set enabling storage and management of data across the plurality of storage objects via a singular entity, and wherein the data set includes associated meta data for mapping the data set to each of the plurality of storage objects, wherein the storage objects change in response to changes in relationship between the data management policy and the data set, wherein the data set is instantiated as a unique logical entity in the data storage system with independently attached metadata and includes references to the plurality of storage objects represented by the data set; and
   providing a report on the usage over time of the storage objects represented by the data set, wherein the storage objects have differing tiers of charging rates, and wherein the usage of the storage objects by the data set is accumulated in accordance with a tier associated with each storage object that is used by the data set, and wherein the usage of the storage objects by the data set is accumulated by comparing logged times associated with the usage with a predetermined list of peak usage rates.

8. The method of claim 7, wherein the report includes billing information related to the data set.

9. The method of claim 8 wherein the data management policy includes a costing rate that is used to determine the billing information.

10. The method of claim 8 wherein the data set is associated with an owner to which the billing information is directed.

11. A data storage system comprising:
    a plurality of storage servers; and
    a storage manager operable to provide a user interface to allow an administrator of the data storage system to:
       define a data set including a plurality of storage objects;
       manage the data set as a single unit according to a data management policy, wherein an action corresponding to the data management policy is directly applied to the data set existing as a unique logical entity in the data storage system, wherein the data set is a singular logical storage unit representation of the plurality of storage objects, the data set enabling storage and management of data across the plurality of storage objects via a singular entity, and wherein the data set includes associated meta data for mapping the data set to each of the plurality of storage objects, wherein the storage objects change in response to changes in relationship between the data management policy and the data set, wherein the data set is instantiated as a unique logical entity in the data storage system with independently attached metadata and includes references to the plurality of storage objects represented by the data set; and provide a report on the usage over time of the storage objects represented by the data set, wherein the storage objects have differing tiers of charging rates, and wherein the usage of the storage objects by the data set is accumulated in accordance with a tier associated with each storage object that is used by the data set, and wherein the usage of the storage objects by the data set is accumulated by comparing logged times associated with the usage with a predetermined list of peak usage rates.

12. The system of claim 11, wherein the report includes billing information related to the data set.

13. The system of claim 12, wherein the data management policy includes a costing rate that is used to determine the billing information.

14. The system of claim 12, wherein the data set is associated with an owner to which the billing information is directed.

* * * * *